US012536795B2

(12) United States Patent
Padwick et al.

(10) Patent No.: US 12,536,795 B2
(45) Date of Patent: Jan. 27, 2026

(54) COMPENSATING FOR OCCLUSIONS IN A DETECTION SYSTEM OF A FARMING MACHINE

(71) Applicant: Deere & Company, Moline, IL (US)

(72) Inventors: Christopher Grant Padwick, Menlo Park, CA (US); Chia-Chun Fu, Sunnyvale, CA (US); Anuradha Chandrashekar, Sunnyvale, CA (US); Umabharathi Govindarajan, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 348 days.

(21) Appl. No.: 17/826,144

(22) Filed: May 26, 2022

(65) Prior Publication Data

US 2023/0281987 A1 Sep. 7, 2023

Related U.S. Application Data

(60) Provisional application No. 63/316,265, filed on Mar. 3, 2022.

(51) Int. Cl.
*G06V 10/764* (2022.01)
*A01B 79/02* (2006.01)
*A01M 7/00* (2006.01)
*G06V 20/10* (2022.01)

(52) U.S. Cl.
CPC ............ *G06V 20/188* (2022.01); *A01B 79/02* (2013.01); *A01M 7/0089* (2013.01); *G06V 10/764* (2022.01)

(58) Field of Classification Search
CPC ... A01B 79/02; A01M 7/0089; G06V 10/764; G06V 20/188; G06V 20/56
See application file for complete search history.

(56) References Cited

U.S. PATENT DOCUMENTS

| 7,218,775 | B2 * | 5/2007 | Kokko | ................... | G06V 20/69 |
| | | | | | 382/156 |
| 10,713,484 | B2 * | 7/2020 | Polzounov | ............. | G06V 20/38 |

(Continued)

OTHER PUBLICATIONS

European Patent Office, Extended European Search Report and Written Opinion, European Patent Application No. 23156599.0, Jul. 25, 2023, 11 pages.

*Primary Examiner* — Tsung Yin Tsai
(74) *Attorney, Agent, or Firm* — Fenwick & West LLP

(57) ABSTRACT

A farming machine is configured to identify and compensate for occlusions in the field of view of its image acquisition system. To do so, the machine captures an image using a first set of capture parameters associated with a first set of treatment results. The farming machine identifies an occlusion in the first image that obstructs a portion of the first image and determines occlusion characteristics representative of the occlusion based on image data in the first image. The farming machine compensates for the identified occlusion based on the occlusion characteristics. The farming machine captures a second image using modified set of capture parameters that compensate for the occlusion. The second image is associated with a second set of treatment results. The farming machine transmits the second set of treatment results to a manager of the farming machine.

15 Claims, 14 Drawing Sheets

(56) References Cited

U.S. PATENT DOCUMENTS

| | | | |
|---|---|---|---|
| 2003/0147776 A1* | 8/2003 | Stroncek | A61M 1/3496 |
| | | | 604/6.02 |
| 2008/0285797 A1* | 11/2008 | Hammadou | G06V 20/52 |
| | | | 382/103 |
| 2013/0051613 A1* | 2/2013 | Bobbitt | G06V 20/52 |
| | | | 382/103 |
| 2014/0232869 A1 | 8/2014 | May et al. | |
| 2017/0071188 A1 | 3/2017 | Rees | |
| 2017/0112057 A1 | 4/2017 | Loukili et al. | |
| 2018/0330165 A1* | 11/2018 | Halligan | G06T 5/60 |
| 2019/0362146 A1* | 11/2019 | Polzounov | G06T 7/10 |
| 2020/0375172 A1 | 12/2020 | Elgart | |
| 2021/0056338 A1* | 2/2021 | Padwick | G06T 7/66 |
| 2021/0078504 A1* | 3/2021 | Skaradzinski | H04N 7/183 |
| 2021/0089771 A1* | 3/2021 | Fu | A01M 7/0089 |
| 2021/0090274 A1* | 3/2021 | Fu | A01C 23/02 |
| 2021/0192745 A1* | 6/2021 | Kahlbaum | G06T 7/254 |
| 2021/0313043 A1* | 10/2021 | Kecskemethy | G06V 30/19173 |
| 2022/0022445 A1* | 1/2022 | Redden | A01G 7/06 |
| 2022/0101554 A1* | 3/2022 | Fu | G06V 10/82 |
| 2022/0136849 A1* | 5/2022 | Pell | G06V 20/56 |
| | | | 701/410 |
| 2022/0207881 A1* | 6/2022 | Agrawal | G06V 10/70 |
| 2022/0405874 A1* | 12/2022 | Barbour | G06V 10/44 |
| 2023/0281987 A1* | 9/2023 | Padwick | A01M 7/0089 |
| | | | 382/110 |

* cited by examiner

COMPENSATING FOR OCCLUSIONS IN A DETECTION SYSTEM OF A FARMING MACHINE

CROSS-REFERENCE TO RELATED APPLICATIONS

This application claims the benefit of priority to U.S. Provisional Application No. 63/316,265 filed Mar. 3, 2022, the disclosure of which is hereby incorporated by reference in its entirety.

BACKGROUND

Field of Disclosure

This disclosure relates generally to identifying occlusions in a field of view of a detection mechanism of a farming machine, and, more specifically, to compensating for the identified occlusion in a manner that allows the farming machine to continue operation.

Description of the Related Art

It is difficult to maintain detection mechanisms of farming machines in their harsh operating environments. This problem compounds for farming machines including autonomous, or semi-autonomous, functionality, because the machine vision techniques require high quality imaging despite the harsh environments. In a particular example, a detection system of a farming machine may suffer from an occlusion that compromises the functionality of a farming machine. Compromised functionality typically persists until a manager of the farming machine clearing the occlusion. Therefore, it would be useful for a farming machine to employ techniques that enable compensation for an occlusion without the occlusion needing to be cleared by the manager.

SUMMARY

A farming machine is configured to identify and compensate for occlusions. An occlusion is an object in a field of view of a camera that obstructs at least a portion of the field of view of the camera.

To identify and compensate for an occlusion the farming machine captures a first image of plants in a field with an image acquisition system. The image is captured using a first set of capture parameters. The first set of capture parameters are associated with a first set of treatment results. For instance, the farming machine may capture an image of the field using a first exposure time, which may be associated with an efficiency of the farming machine using images captured with the first exposure time.

The farming machine identifies an occlusion in the first image that obstructs a portion of the first image. Identifying the occlusion in the first image may cause the farming machine to perform static object detection on pixels in the first image captured by the image acquisition system. Additionally, or alternatively, identifying the occlusion in the first image may cause the farming machine to apply an object classifier to the first image, which classifies plants and occlusions in the first image. The occlusion may or may not be part of the farming machine.

The farming machine determines occlusion characteristics representative of the occlusion based on image data in the first image. The occlusion characteristics may include characteristics such as size, shape, color, and location in the image, etc.

The farming machine generates a modified set of capture parameters to compensate for the identified occlusion based on the occlusion characteristic. Generating a modified set of capture parameters may include generating a dynamic mask for applying to pixels of images captured by the image acquisition system. In this case, the dynamic mask is configured to remove pixels from the images obstructed by the occlusion. Similarly, generating a modified set of capture parameters may include generating a dynamic mask for applying to an output of the object classifier configured to identify plants and occlusions. In this case the, the dynamic mask may be configured to remove outputs of the object classifier classified as the occlusion.

The farming machine captures a second image of plants in the field with the image acquisition system using the modified set of capture parameters. The farming machine captures the second image as the farming machine is identifying and treating plants in the field, and the treatments are associated with a second set of treatment results. The second set of treatment results may or may not be different from the first set of treatment results.

The farming machine transmits the second set of treatment results to a manager of the farming machine. Transmitting the second set of treatment results to the manager may further comprise determining a difference between the first set of treatment results and the second set of treatment results. In this case, responsive to the difference being greater than a threshold difference, the farming machine may transmit the second set of results to the manager of the farming machine.

Several situations of transmitting the second set of results are possible. For example, the farming machine may transmit the second set of treatment results when the first set of treatment results and the second set of treatment results quantify an efficiency of treating plants in the field, and the second set of treatment results are lower than the first set of treatment results. In another example, the farming machine may transmit the second set of treatment results when the first set of treatment results and the second set of treatment results quantify an expected amount of treatment fluid applied in the field, and the second set of treatment results are higher than the first set of treatment results. In another example, the farming machine may transmit the second set of treatment results when the first set of treatment results and the second set of treatment results quantify an expected number of plants treated by the farming machine, and the second set of treatment results are different from the first set of treatment results.

Figure 1A:
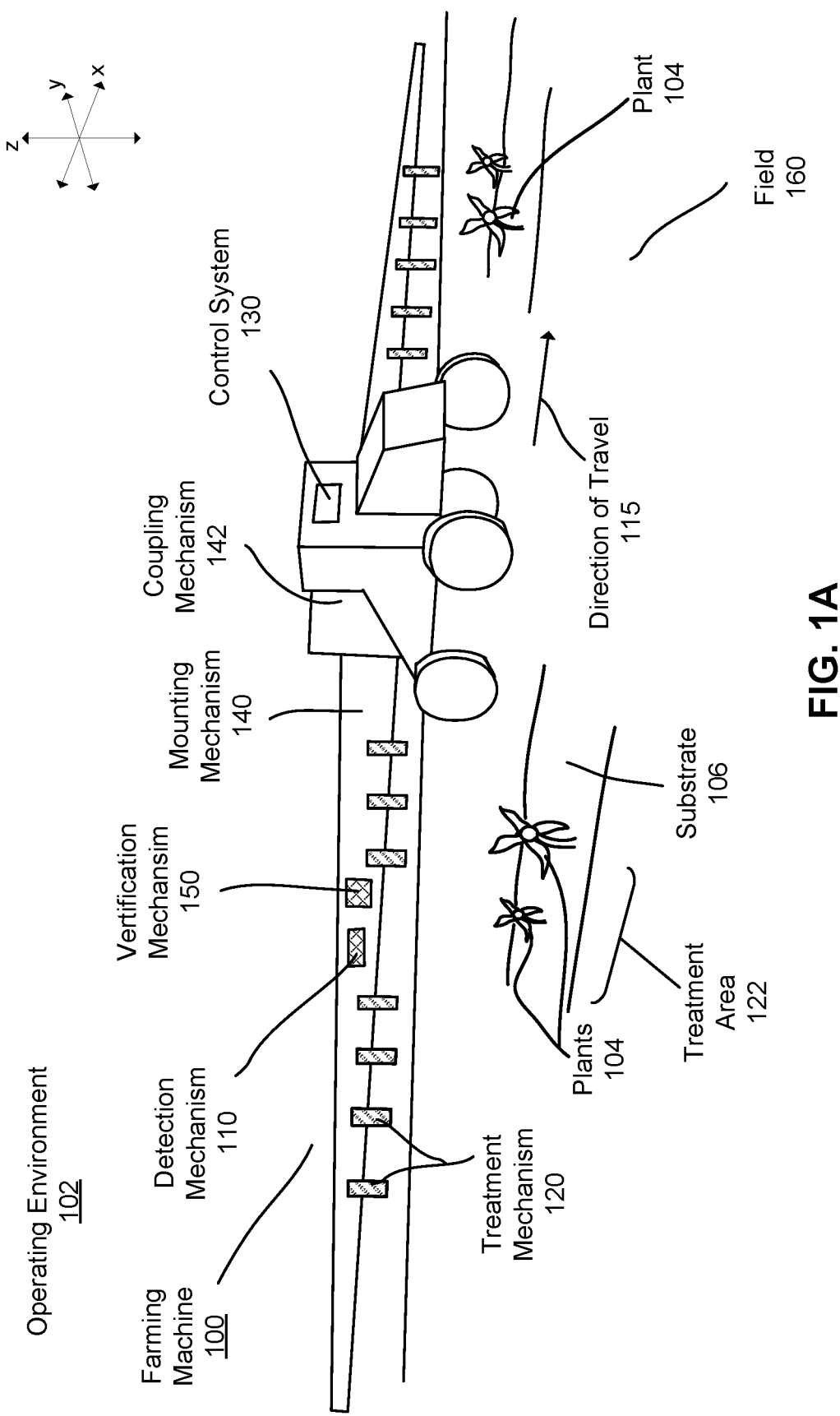
FIG. 1A is an isometric view of a farming machine that performs farming actions of a treatment plan, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

As farming machine technology advances, more and more farming actions implemented by those farming machines become autonomous or semi-autonomous. Enabling the autonomy of farming machines are complex process flows that rely on complex machine vision techniques. Unfortunately, in environments which farming machines normally operate, the detection mechanisms employed by the machine vision techniques are subject to harsh imaging environments. For instance, a detection mechanism may be employed in dusty, hot, cold, freezing, wet, muddy, bumpy, windy, etc. farming machine environments.

Because these environments are so harsh, occlusions may occur in front of a detection mechanism that negatively affects the machine vision processes of the farming machine. By way of example, an occlusion may occur when mud splashes onto a lens of detection mechanism, wind blows a part of the farming machine into a field of view of the detection mechanism, ice may form on a detection mechanism, etc. Whatever the case, the occlusions may negatively affect performance of the farming machine by preventing the farming machine from accurately performing a farming action, or by causing the farming machine to perform a farming action when it should not.

As such, described herein is a farming machine configured to identify occlusions in images captured be a detection mechanism, and compensate for that occlusion such that performance of the farming machine continues at a sufficient level. If the compensation actions do not maintain farming machine performance, the farming machine may generate a notification for a manager of the farming machine describing that the detection mechanism includes an occlusion that is detrimental to farming machine performance.

II. Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
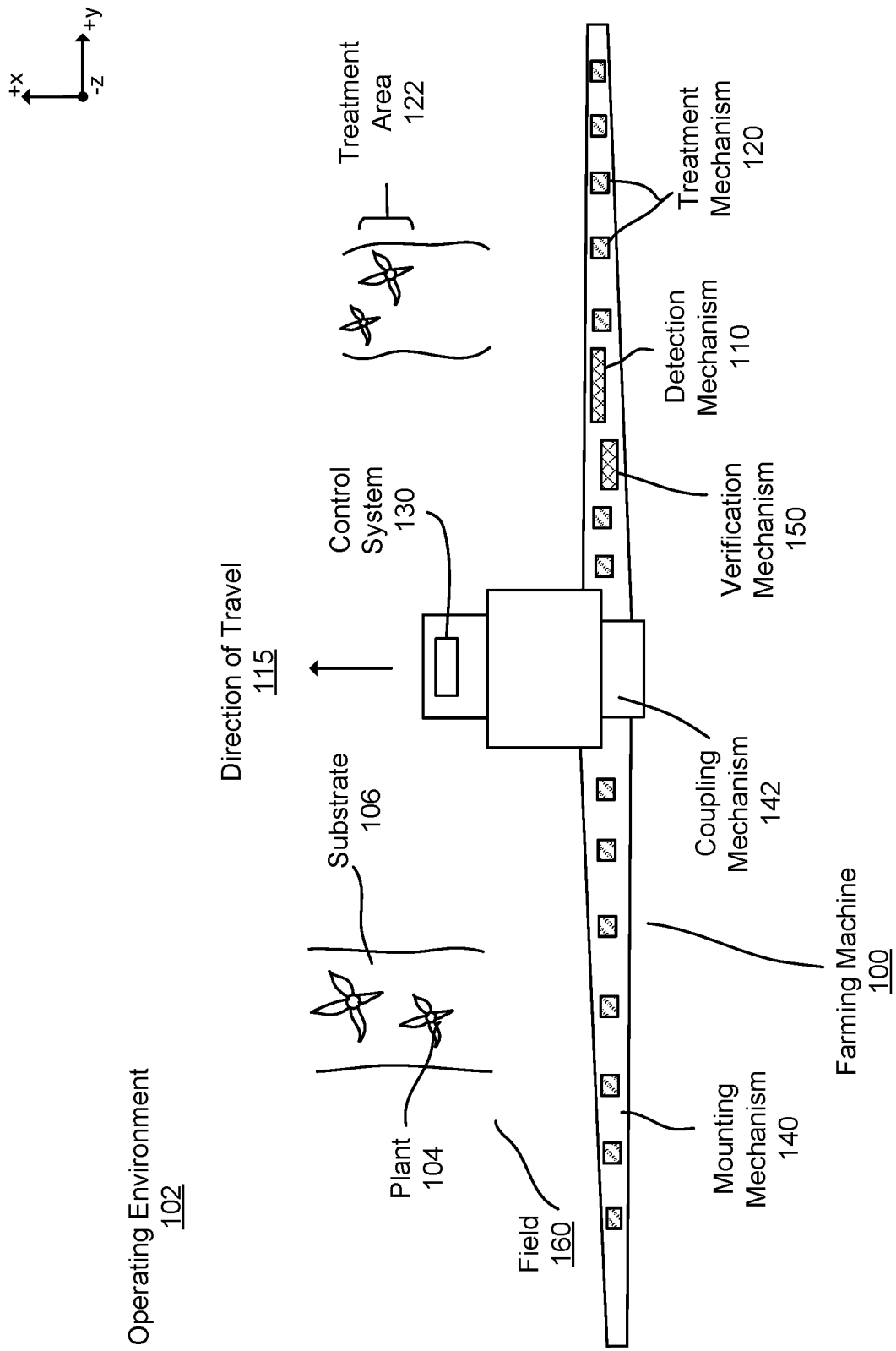
FIG. 1B is a top view of the farming machine, according to one example embodiment.
Figure 1C:
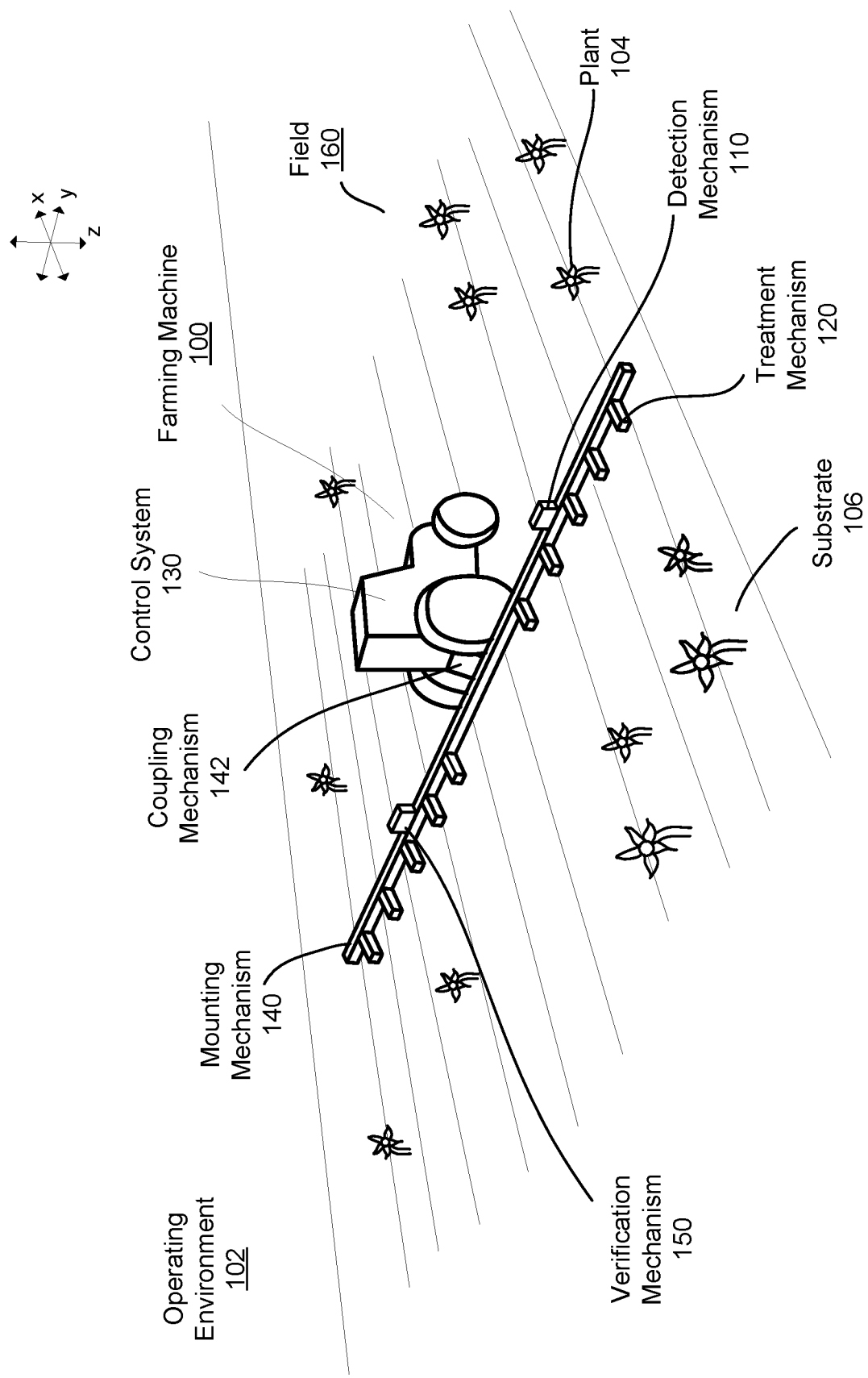
FIG. 1C is an isometric view of another farming machine that performs farming actions of a treatment plan, according to one example embodiment.

FIG. 1A is an isometric view of a farming machine that performs farming actions of a treatment plan, according to one example embodiment, and FIG. 1B is a top view of the farming machine in FIG. 1A. FIG. 1C is an isometric view of another farming machine that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

II. A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multi spectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multi spectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module 510 to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

II.B System Environment

Figure 2:
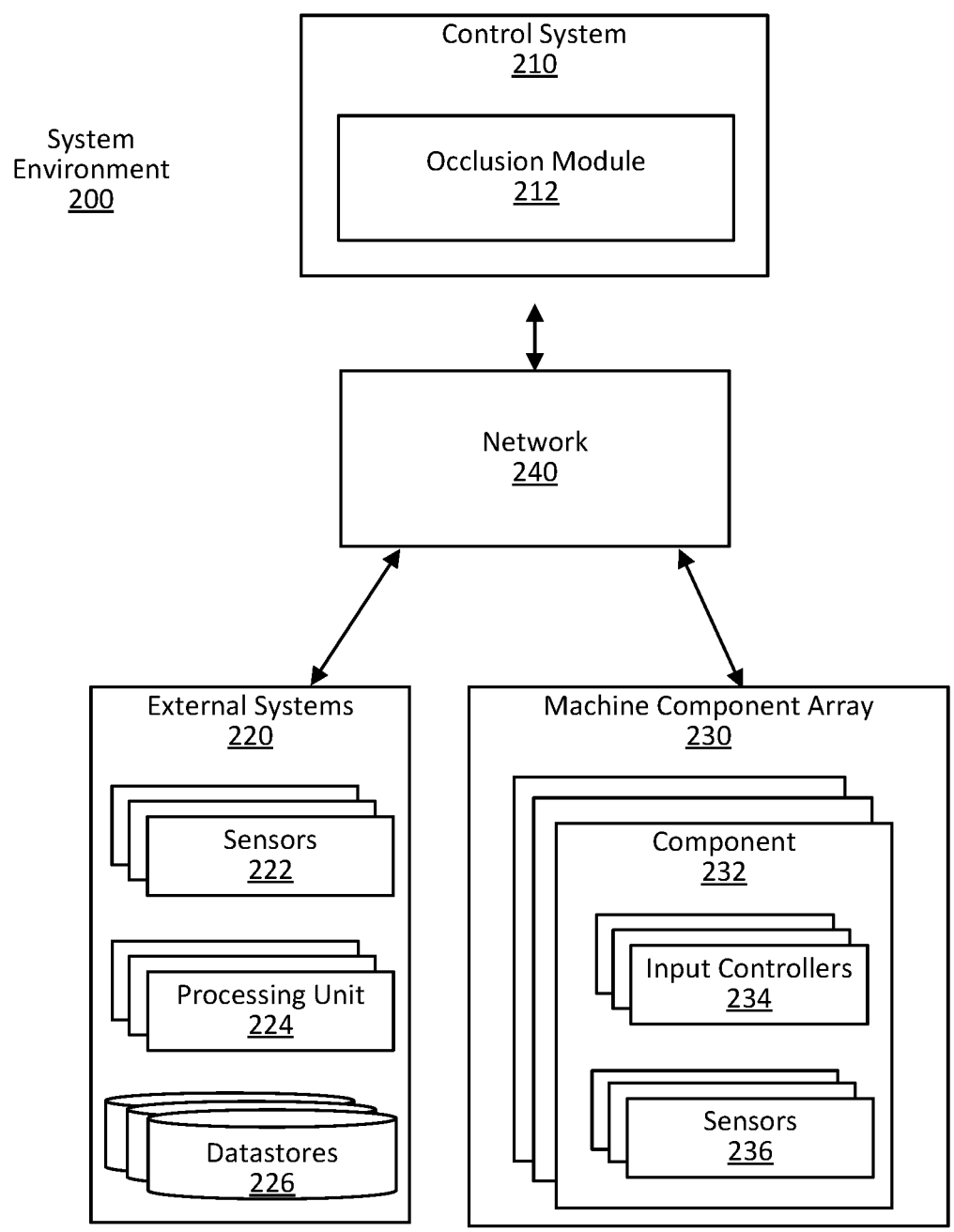
FIG. 2 is a block diagram of the system environment for the farming machine, in accordance with one or more example embodiments

FIG. 2 is a block diagram of the system environment for the farming machine, in accordance with one or more example embodiments. In this example, the control system 210 (e.g., control system 130) is connected to external systems 220 and a machine component array 230 via a network 240 within the system environment 200.

The external systems 220 are any system that can generate data representing information useful for identifying occlusions and compensating for those occlusions. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 240 may process measured data to provide additional information that may aid in identifying and compensating for occlusions. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be identifying and compensating for occlusions. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 230 receives information from external systems 220 and the machine component array 220 and implements a treatment plan in a field with a farming machine. In particular, the control system 230 employs an occlusion module 212 to identify occlusions, generate compensation actions, and evaluate performance of the farming machine in response to those compensation actions. The occlusion module 212 is described in greater detail below in regard to FIG. 5.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Occlusions for a Farming Machine

To begin, it will prove useful to describe occlusions in the context of an automated farming machine. To provide illustration, consider an autonomous or semi-autonomous farming machine similar to those described in regard to FIGS. 1A-1C. That is, the farming machine is configured to implement treatment actions of a treatment plan, e.g., treating identified plants in a field with a spray treatment. To implement the farming machine, the farming machine captures images of its environment using a detection system, the control system identifies plants in the image, generates treatment instructions for the plant, and the farming machine implements the treatment instructions to treat the plant.

Inherent to this workflow is the assumption that the farming machine is capable of accurately identifying plants in images to implement the treatment plan. However, in some instances, various objects come between the detection mechanism and the environment such that there is an occlusion in the image. An occlusion is an object in an image that obstructs the field of view of the detection mechanism such that the farming machine is unable to accurately identify objects in the fields. Moreover, in some examples, occlusions may be mis-identified such that the farming machine implements farming actions of the treatment plan incorrectly (e.g, a false-positive identification).

Figure 3A:
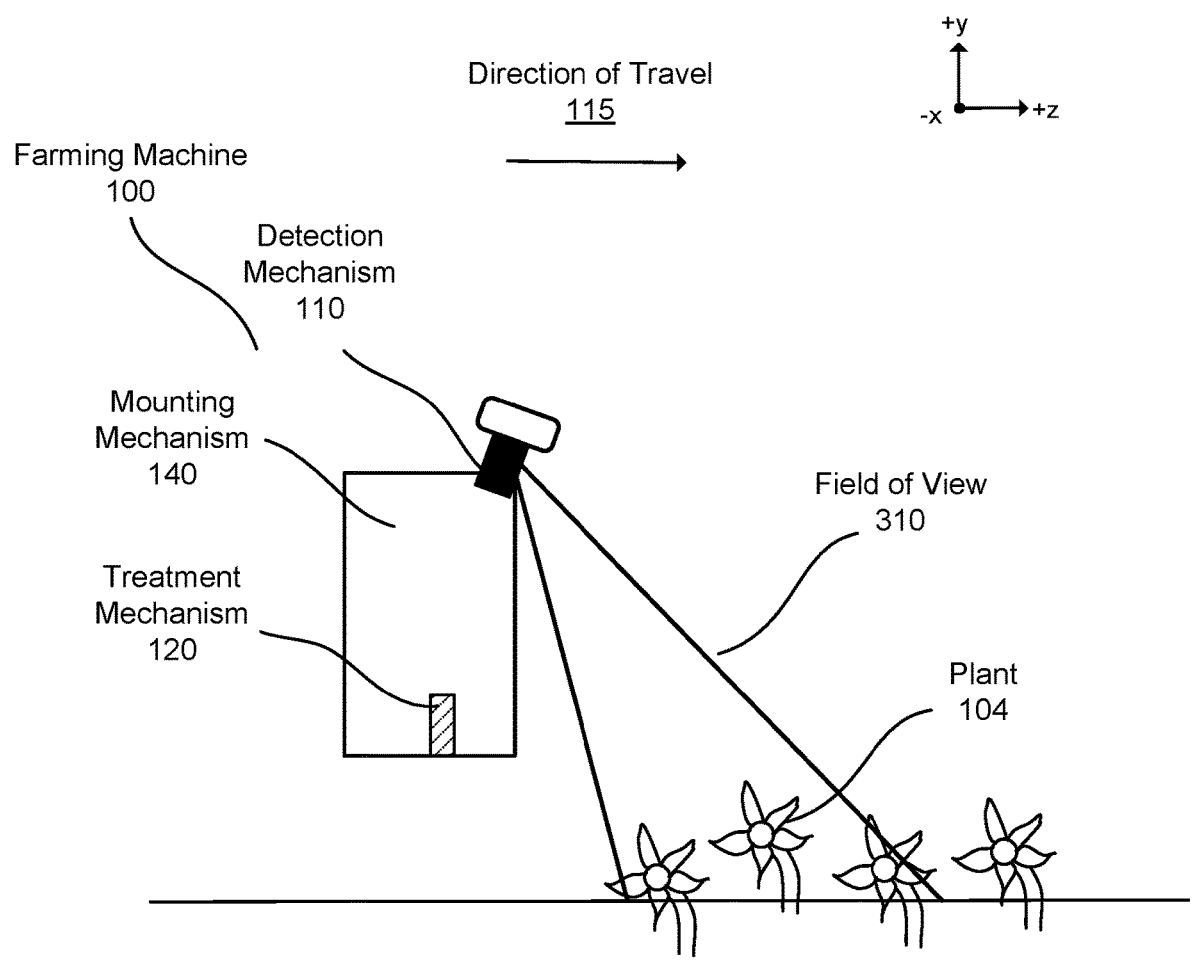
FIG. 3A shows a cross-sectional view of a detection mechanism of a farming machine without an occlusion, according to one example embodiment.

To illustrate, FIG. 3A shows a cross-sectional view of a detection mechanism of a farming machine without an occlusion, according to one example embodiment. The farming machine 100 is moving in the direction of travel 115. A detection mechanism 110 is mounted to a mounting mechanism 140, and a treatment mechanism 120 is configured to treat plants 104 identified in images captured by the detection mechanism 110.

A field of view 310 of the detection mechanism 110 projects downwards and forwards from the farming machine 100. As the farming machine 100 moves along the direction of travel 115, various objects pass into the field of view 310 and those objects may be identified by the farming machine 100. In the example of FIG. 3A, plants 104 are in the field of view 310 such that the detection mechanism 110 captures one or more images of the plants 104 as it moves along the direction of travel 115. Importantly, in the example of FIG. 3A, there are no occlusions in the field of view 310 such that objects in the field are obstructed from the detection mechanism 110.

Figure 3B:
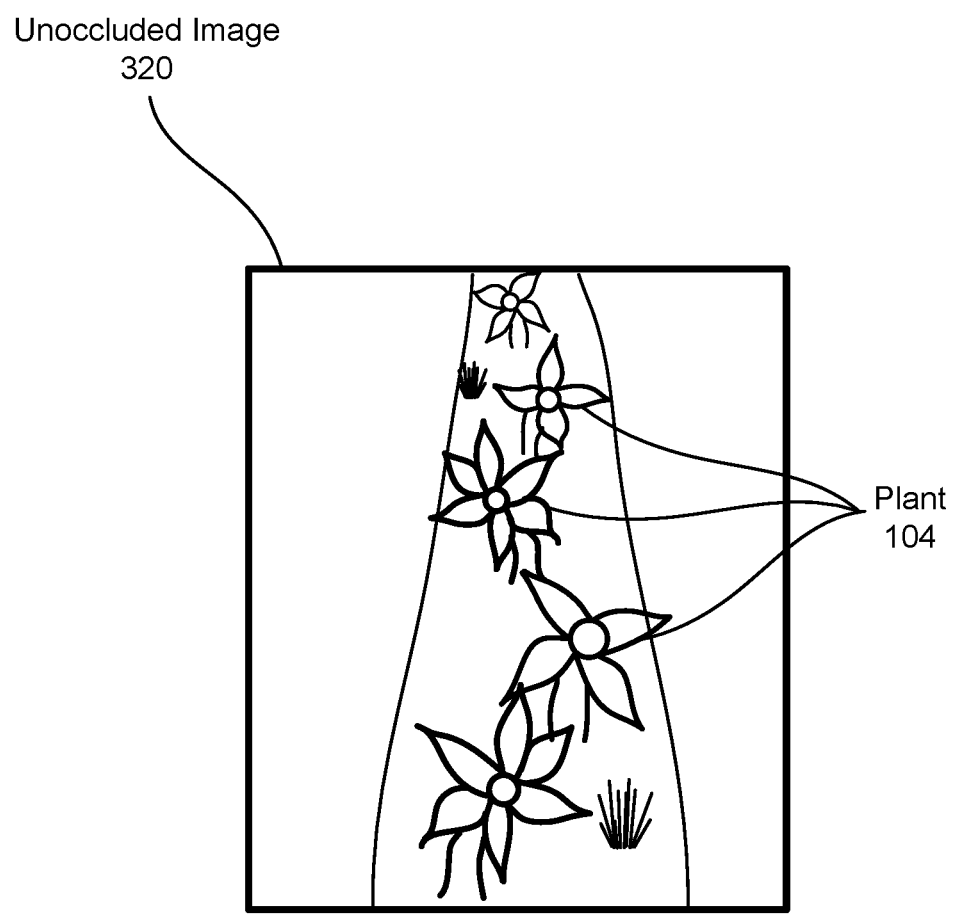
FIG. 3B illustrates an image captured by a detection mechanism without an occlusion, according to one example embodiment.

FIG. 3B illustrates an image captured by a detection mechanism without an occlusion, according to one example embodiment. This "unoccluded image" 320 reflects a field of view in an image detection system without an occlusion at the time that image was captured. As shown in FIG. 3B, the unoccluded image 320 includes the field of view approximating the field of view 310 in FIG. 3A. That is, the unoccluded image shows plants that pass into the field of view of the farming machine of FIG. 3A.

Figure 4A:
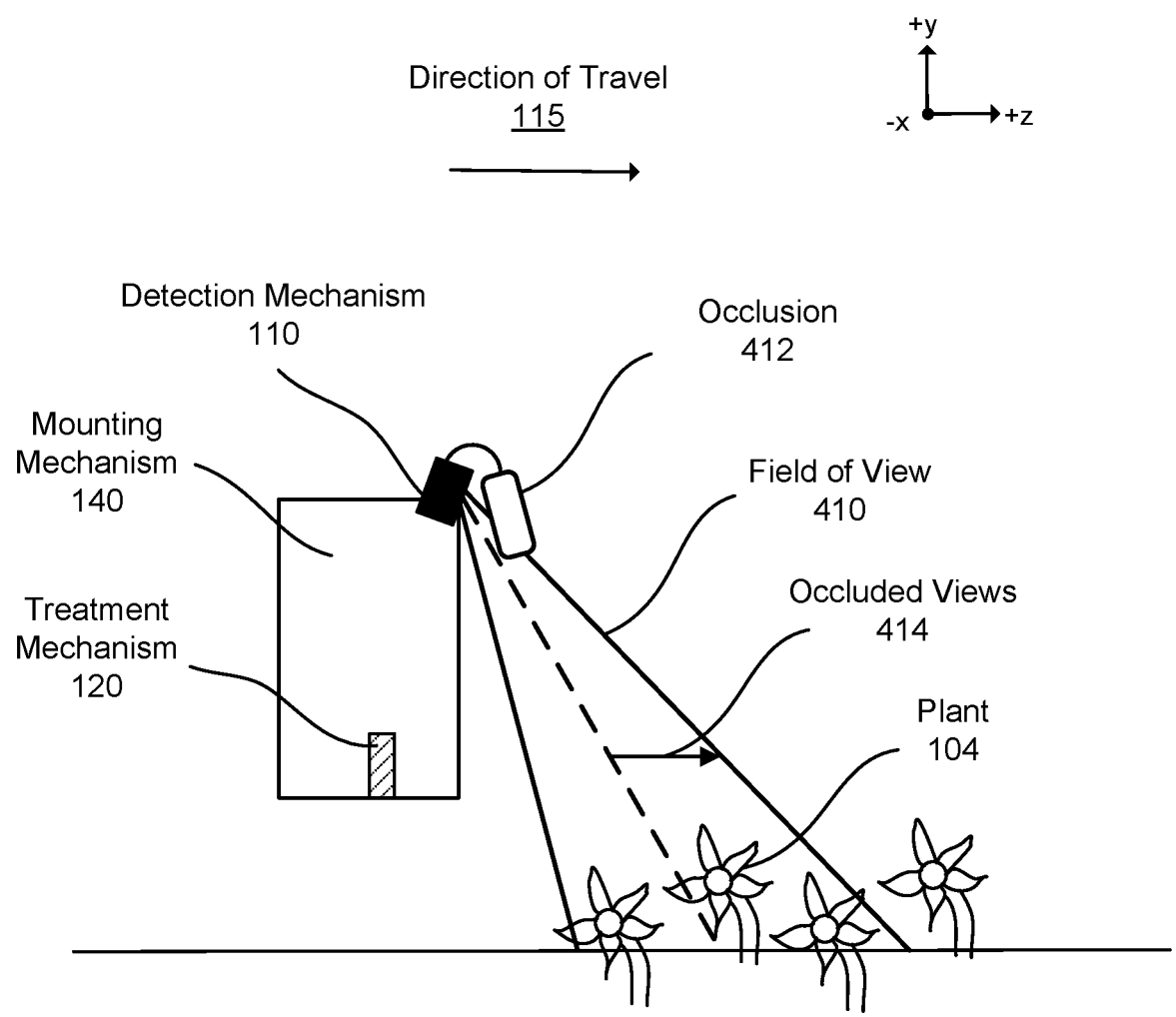
FIG. 4A shows a cross-sectional view of detection mechanism of a farming machine with an occlusion, according to one example embodiment.

FIG. 4A shows a cross-sectional view of detection mechanism of a farming machine with an occlusion, according to one example embodiment. The farming machine 100 is moving in the direction of travel 115. A detection mechanism 110 is mounted to a mounting mechanism 140, and a treatment mechanism 120 is configured to treat plants 104 identified in images captured by the detection mechanism 110.

In FIG. 4A, a field of view 410 of the detection mechanism 110 projects downwards and forwards from the farming machine 100. As the farming machine 100 moves along the direction of travel 115, various objects pass into the field of view 410 and those objects may be identified by the farming machine 100. However, there is an occlusion 412 in the field of view 410 of the detection mechanism 110. That is, there is an object (e.g., part of the detection mechanism 110) occluding the field of view 410 such that there are occluded views 414. Because there are occluded views 414, images captured by the detection mechanism 110 will include the occlusion 412 (rather than the plants 104 obscured by the occluded views 332).

Figure 4B:
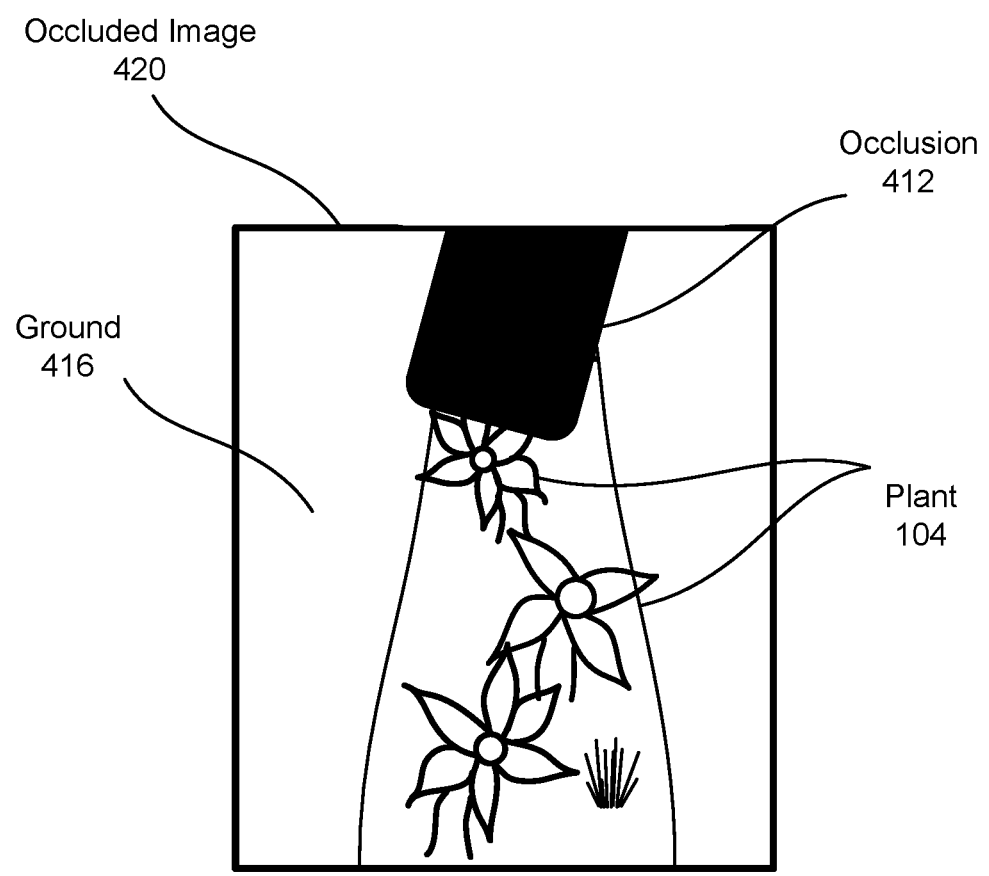
FIG. 4B illustrates an image captured by a detection system with an occlusion, according to one example embodiment.

FIG. 4B illustrates an image captured by a detection system with an occlusion, according to one example embodiment. This "occluded image" 420 reflects a field of view a detection mechanism 110 with occluded views caused by an occlusion at the time that image was captured. As shown in FIG. 3B, the occluded image 420 includes the field of view approximating the field of view 410 in FIG. 4A. That is, the occluded image shows plants 104 that pass into the field of view 410, but only shows the occlusion 412 where it causes occluded views.

V. Compensating for Occlusions

As described above, the farming machine employs a control system with an occlusion module 212 to identify and compensate for occlusions that detrimentally affect operation of a farming machine.

Figure 5:
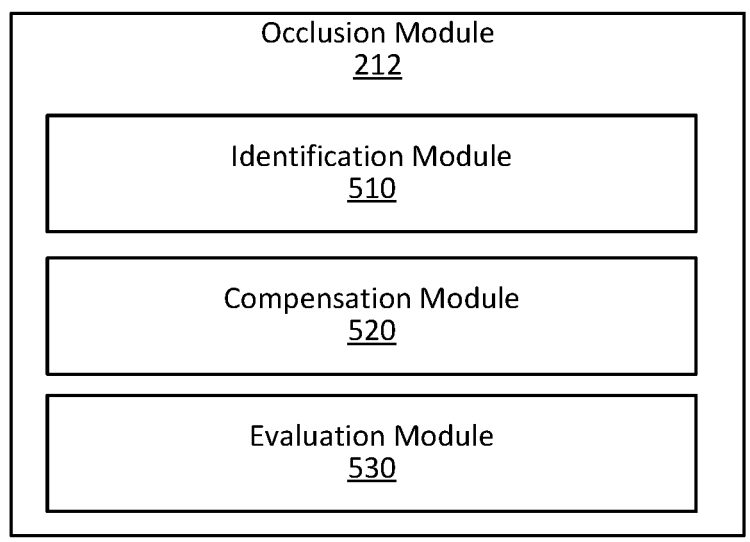
FIG. 5 illustrates an example occlusion module implemented by a control system of a farming machine, according to one example embodiment.

FIG. 5 illustrates an example occlusion module implemented by a control system of a farming machine, according to one example embodiment. The occlusion module 212 includes an identification module 510, a compensation module 520, and an evaluation module 530. The occlusion module 212 may include additional or fewer modules, the functionality of each module may be attributable to other modules, and/or the modules may be arrayed in a different manner than the manner shown. Whatever the case, the occlusion module 212 is configured to identify and compensate for occlusions as a farming machine 100 implements a treatment plan in a field.

V.A Identifying Occlusions in an Image

The occlusion module 212 includes an identification module 510 configured to identify pixels in an image captured by a detection mechanism 110 as an occlusion. More simply, the identification module 510 determines whether pixels in an image represent an occlusion, or not. As an illustrative example, return to the examples of an unoccluded image 320 in FIG. 3B and an occluded image 420 in 4B. In these examples, the identification module 510 is configured to determine that the unoccluded image 320 does not contain pixels representing an occlusion 412, while the occluded image 420 does contain pixels representing an occlusion 412.

The identification module 510 may be configured to identify an occlusion in an image in several manners. Some examples that the identification module 510 may implement include a static detection model, an image difference model, or a semantic segmentation model. Of course, other methodologies of identifying an occlusion in an image are also possible.

In the first example, the identification module 510 may implement a static detection model to identify pixels in an image representing an occlusion. A static detection model determines whether pixels in subsequent images are changing (e.g., color values), and, if those pixels do not change, the identification module 510 determines that the unchanging pixels represent an occlusion.

To illustrate, again consider the occluded image 420 in FIG. 4B. Now consider that this occluded image 420 is just one image from a time series of images captured by a detection mechanism 110 as a farming machine 100 moves through the field 160. Thus, images in the time series may have slightly different image data because the farming machine 100 is moving and the field of view is changing. In this example, differences in the images would include plants moving from the background to the foreground over successive images. The occlusion 412, however, remains static throughout the images because it is always in same position in the field of view of the detection mechanism 110 and creates the same obstructed views in the images. Accordingly, the identification module 510 may determine that the unchanging pixels in the images represent an occlusion 412, and the farming machine 100 may then implement appropriate compensation measures as discussed herein. Other examples of static detection are also possible.

In a second example, the identification module 510 may implement an image difference model to identify pixels in an image representing an occlusion. An image difference model determines whether differences between pixels in two, separate images represent an occlusion.

To illustrate, consider the unoccluded image 320 in FIG. 3B and the occluded image 420 in FIG. 4B. Now consider that this image pair is captured by the farming machine 100 and include approximately the same field of view. Because the two have approximately the same field of view, the farming machine 100 pixels in the image should be largely similar. In this case, however, there is an occlusion 412 in the occluded image 420 that is not present in the unoccluded image 320. As such, the occlusion identification module 510 may determine that the pixels in the occluded image that are different from the unoccluded image represent an occlusion, and the farming machine may then implement appropriate compensation measures as discussed herein. Other examples of image differences are also possible.

In a third example, the identification module 510 may implement a pixelwise semantic segmentation model ("segmentation model") that includes a class configured to represent occlusions. In this case, the identification module 510 may determine that pixels identified by the segmentation model as having the occlusion class represent occlusions. Notably, the occlusion label can include many different objects seen an occluded image, such as, for example, occlusion, implement, lens object, hose, etc.

To illustrate, consider the occluded image in FIG. 4B. Now consider that the identification module 510 applies a segmentation model to identify occlusions. That is, the identification module 510 inputs the occluded image into a segmentation model, and the segmentation outputs a classified image whose pixels are classified as, e.g., plant, ground, or occlusion. In other words, the identification module 510 classifies pixels representing plants 104 as plant pixels, pixels representing ground 416 as ground pixels, and pixels representing occlusions 412 as occlusion pixels. Accordingly, the identification module 510 may determine that pixels in the occluded image labelled occlusion represent occlusions, and the farming machine 100 may implement appropriate compensation measures as discussed herein.

In a fourth example, the identification module 510 may identify occlusion based on differences between expected input/output and actual input/output. For example, a semantic segmentation model may be configured to output a segmentation map with an expected resolution. However, if an occlusion is present in the input image for the segmentation model, the output may have a reduced resolution relative to the expected resolution. As such, the identification module 510 may determine that there is an occlusion present in the image that generated an output with reduced resolution. A similar analysis can be made for input images. That is, if a captured image has a lower resolution than an expected resolution, the identification module 510 may determine the image has an occlusion.

The identification module 510 is also configured to determine characteristics about an occlusion. The identified characteristics may be employed to determine compensation actions for the occlusion. Characteristics about an identified occlusion may be, for example, a size of the occlusion in the image, a size of the occlusion in the environment, a location of the occlusion in the image, a location of the occlusion in the environment, a type of occlusion (e.g., implement or dust), a shape of the occlusion, a camera associated with the identified occlusion, camera parameters associated with the occlusion, etc. Identifying the types of occlusion may also include identifying, for example, a hose, a specific type of implement, sensors, etc. In doing so the identified type of occlusion may be used in determining whether to notify the operator of the occlusion.

The occlusion module 212 determines a method for compensating for an identified occlusion using identified occlusions and their characteristics. As a simple example, consider a farming machine 100 that identifies an occlusion that obscures pixels in an occluded image, and determines that the occlusion obscures 86% of the pixels in the occluded image. As such, the farming machine 100 accesses the identified characteristics for the occlusion and generates a compensation action for the occlusion. In this case, the farming machine 100 accesses the address of the detection mechanism 110 which captured the occluded image, determines the physical address of the detection mechanism 110 on the farming machine 100, and transmits a notification to an operator of the farming machine 100 that there is a large occlusion in front of the identified detection mechanism 110. The operator may then travel to the occluded camera and clear the occlusion.

IV.B Compensating for Identified Occlusions

The occlusion module 212 includes a compensation module 520 configured to generate a compensation action. A compensation action is an action, or set of actions, performable by the farming machine 100 to compensate for an occlusion identified by the identification module 510. Generally, compensating for an occlusion allows the farming machine 100 to perform robustly without an operator having to manually clear the occlusion.

Many different compensation actions are possible, and compensation actions generated by the compensation module 520 can depend on a variety of factors. For example, the compensation action may be generated based on occlusion characteristics, farming actions being performed by the farming machine, a farming objective, a treatment plan, farming machine characteristics, results, a time of day, or any other factors that may be used to generate a compensation action. The compensation module 520 implements compensation to compensate for identified occlusions.

Some examples of an occlusion module 212 generating a compensation action are described below, but they are not intended to be limiting in scope.
Cropping an Occluded Image In a first example, the compensation module 520 generates a cropping compensation action ("cropping action") to compensate for an occlusion. A cropping action compensates for the occlusion by cropping an image to a reduced size such that pixels representing the occlusion are removed from the occluded image.

To illustrate, recall the occluded image 420 from FIG. 4B. There, the occluded image 420 is captured by a detection mechanism 110 and includes an occlusion 412 on the top third of the occluded image 420. The identification module 510 determines characteristics for the occlusion 412 representing, at least, its size and location. Based on the characteristics, the compensation module 520 generates a cropping action for applying to images captured by the detection mechanism 110.

The compensation module 520 applies compensation action. To do so, the compensation module 520 crops the top third of images captured by the detection mechanism 110 to prevent the occlusion 412 from occurring in images processed by the farming machine 100. In doing so, the compensation module 520 reduces negative performance effects for the farming machine 100 that may occur from occlusions in an image.
Modifying Capture Parameters In a second example, the compensation module 520 generates a capture compensation action ("capture action") to compensate for an occlusion. A capture action compensates for an occlusion by modifying capture parameters of a detection mechanism 110 to reduce or remove pixels representing an occlusion from captured images. Capture parameters generally refer to the capture parameters of a detection mechanism 110 such as focal length, zoom, image size, field of view etc., but could include other parameters.

To illustrate, recall the occluded image 420 from FIG. 4B. The identification module 510 determines characteristics for the occlusion 412 representing, at least, its size and location. Based on the characteristics, the compensation module 520 generates a capture compensation action for applying to the detection mechanism 110. Here, the capture action modifies the field of view of the detection mechanism 110 to reduce the number of pixels in the image representing the occlusion 412.

The compensation module 520 applies capture action. To do so, the compensation module 520 modifies the capture parameters of the detection mechanism 110 according to those indicated by the capture action. Here, modifying the capture parameters changes the field of view of the detection mechanism 110. In doing so, the compensation module 520 reduces negative performance effects for the farming machine 100 that may occur from having occlusions in an image.
Modifying Machine Parameters In a third example, the compensation module 520 generates a machine parameter compensation action ("machine action") to compensate for an occlusion. A machine action compensates for an occlusion by modifying farming machine parameters to reduce or remove pixels representing an occlusion from an image or reduce the effects of occlusions in an image. Machine parameters generally refer to the parameters controlling the physical implementation of the farming machine 100 such as speed, direction, machine form, implantation of farming actions, etc.

To illustrate, recall the occluded image 420 from FIG. 4B. The identification module 510 determines characteristics for the occlusion 412 representing, at least, the size and location of the occlusion. Based on the characteristics, the compensation module 520 generates a machine action for applying to farming machine 100. Here, the compensation module 520 generates a machine action that reduces the speed of the farming machine 100 to account for the occlusion 412.

The compensation module 520 applies the machine action to the farming machine 100. To do so, the compensation module 520 modifies machine parameters of the farming machine 100 according to those indicated by the machine action. Here, modifying the machine parameters reduces the speed of the farming machine 100 to compensate for occlusions in images. In doing so, the compensation module 520 reduces negative performance effects for the farming machine 100 that may occur from having occlusions in an image.
Generating a Dynamic Mask In a fourth example, the compensation module 520 generates a dynamic mask compensation action ("mask action") to compensate for an occlusion. A mask action creates a dynamic mask to apply to either an input image or an output from the identification model (e.g., segmentation, differences, etc.). For an input image, the dynamic mask reduces, removes, or nullifies image data in regions of an image including an occlusion. For an output from a model, the dynamic mask reduces or removes classification data in regions of an image including an occlusion.

Figure 6A:
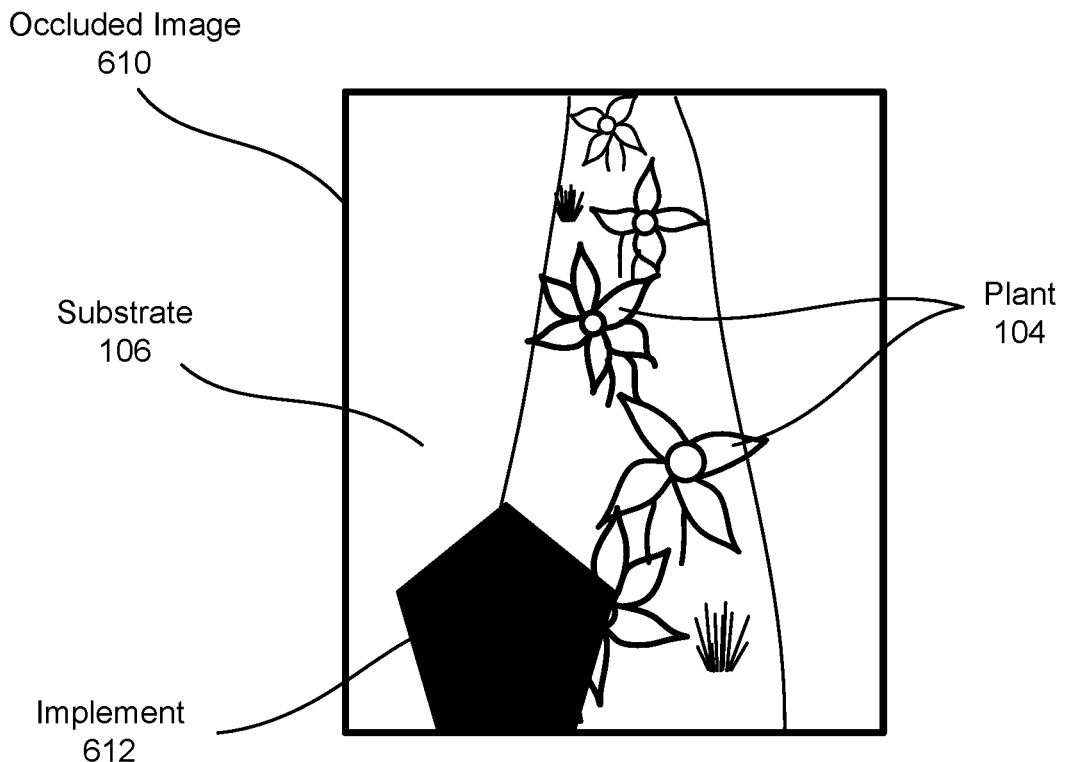
FIG. 6A shows an occluded image, according to one example embodiment.

To illustrate, FIG. 6A shows an occluded image, according to one example embodiment. The occluded image 610 comprises image data representing plants 104, substrate 106, and a farming implement 612. The farming implement 612 in the occluded image 610 is an occlusion because it prevents the detection mechanism 110 from capturing at least some information in its field of view. The identification module 510 identifies the occlusion and its characteristics using methodologies described hereinabove.

Figure 6B:
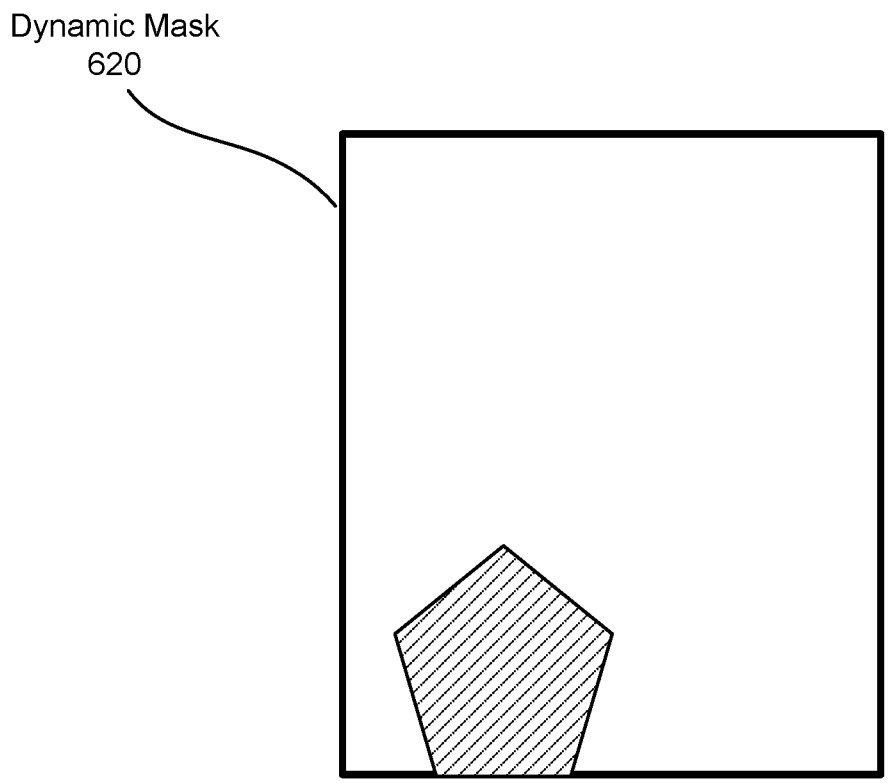
FIG. 6B illustrates a dynamic mask corresponding to the occluded image in FIG. 6A, according to one example embodiment.

The compensation module 520 generates a dynamic mask based on the identified occlusion (i.e., the implement 612) and its characteristics. FIG. 6B illustrates a dynamic mask corresponding to the occluded image in FIG. 6A, according to one example embodiment. In the representation of the dynamic mask 620, white areas are those which do not reduce image data and patterned areas are those which do reduce image data. Notably the patterned area (where image data will be reduced) aligns to the occlusion (i.e., the implement 612) in the occluded image 610.

Figure 6C:
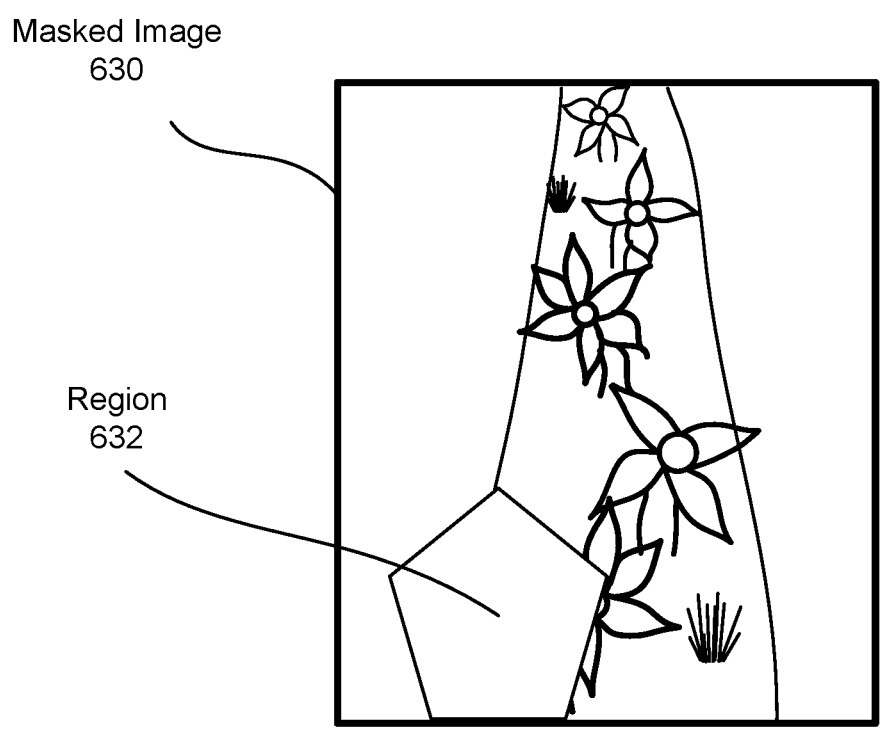
FIG. 6C shows a masked image, according to one example embodiment.

Thus, in a first example, the compensation module 520 can apply the dynamic mask to an occluded image to reduce image data in areas indicated by the dynamic mask (e.g., the dark areas). To illustrate, FIG. 6C shows a masked image, according to one example embodiment. To generate the masked image 630, the compensation module 520 generates the dynamic mask 620 and applies the dynamic mask to an occluded image (e.g., occluded image 610) to generate the masked image 630. The masked image 630 includes a region 632 where image data is reduced. That is, image data in the region 632 is reduced, removed, nullified, etc., such that the implement 612 no longer appears in the masked image 630 as an occlusion.

In a second example, the compensation module 520 can apply a dynamic mask to a classified image rather than an occluded image (i.e., to an output rather than an input), although the process is not described in detail.

IV.C Evaluating Occlusion Compensations

Compensating for identified occlusions typically reduces the number of interactions an operator makes with her farming machine. That is, because the occlusion module 212 is configured to generate and implement compensation actions, the operator generally spends less time clearing occlusions from detection mechanisms 110. However, this process is imperfect, and, in some cases, implementation of a compensation action may reduce performance of a farming machine 100.

To illustrate, consider a farming machine 100 with a farming objective of treating weeds in the field 160 with a treatment mechanism 120. The farming machine 100 includes an occlusion module 212 configured to identify occlusions and generate compensation actions in response. As the farming machine 100 performs farming actions for treating weeds in the field 160, one of the tubes that carries treatment fluid to a treatment mechanism 120 is knocked loose. The loose tube has entered the field of view of the detection mechanism 110 and the occlusion module 212 has generates compensation actions to compensate for the occlusion. The compensation action allow the farming machine to continue without intervention from an manager of the farming machine 100 need not intervene to remove the occlusion.

However, the tube continues to loosen as the farming machine 100 travels through the field 160. As it loosens, the tube begins to take up more and more of the field of view of the detection mechanism 110. In other words, the loose tube is "blinding" the detection mechanism 110 over time. While the compensation module 520 is configured to take compensation actions to account for the occlusion, at some point additional compensation actions may reduce performance of the farming machine 100. When this occurs, the occlusion module 212 generates an alert for a manager of the farming machine 100 that an occlusion is degrading performance of the farming machine 100, and that the occlusion module 212 cannot compensate for the occlusion without sacrificing performance of the farming machine 100.

To address this circumstance, the occlusion module 212 includes an evaluation module 530. The evaluation module 530 is configured to evaluate compensation actions by monitoring performance of a farming machine 100 as the occlusion module 212 implements the compensation actions. Moreover, the evaluation module 530 is configured to generate a notification for a manager if implemented compensation actions are unable to maintain sufficient performance of a farming machine 100.

There are several methods for evaluating compensation actions, some of which are described below. Notably, those discussed below or not intended to be limiting.

Measuring Results

In a first example, the evaluation module 530 evaluates compensation actions by measuring results of farming actions, treatment plans, and/or farming objectives of the farming machine. Moreover, the evaluation module 530 monitors changes in measured results before, and after, implementation of a compensation action. If measured results change substantially after implementation of a compensation action, the farming machine 100 may generate a notification to transmit to a manager of the farming machine 100 indicating the presence of an occlusion.

To illustrate, consider a farming machine 100 implementing farming actions to treat plants 104 with a treatment fluid via a treatment mechanism 120. The spray treatment applied by the treatment mechanism 120 may have a first treatment result. The first treatment result may be an expected treatment result if the farming machine 100 is operating nominally (i.e., without an occlusion and a corresponding compensation action). The treatment result may be any quantification of the farming action including treatment area size, fluid dispensed, accuracy, precision, etc.

Over time, the occlusion module 212 identifies an occlusion in images captured by a detection mechanism 110 and generates a compensation action to compensate for the occlusion. After implementing the compensation action, the farming machine 100 then implements the farming action again. However, because the compensation action was implemented, the same farming action has a second treatment result. In an ideal situation, the second treatment result is the same (or nearly the same) as the first treatment result because the compensation action is compensating for the occlusion proficiently. However, in some situations, the second treatment result may be worse than the first treatment result. For example, the second treatment result may indicate that the treatment area size is larger, the fluid dispensed is greater, accuracy has decreased, etc.

The evaluation module 530 determines that the compensation action is resulting in reduced performance of the farming machine 100, and the evaluation module 530 generates a notification for the operator. Reduced performance leading to a notification can be a relative reduction in results, an absolute reduction of results, an absence of a result, etc. The notification transmitted to the manager may indicate what type of performance degradation is causing the evaluation module 530 to generate the notification.

Thresholds

In a second example, the evaluation module 530 evaluates compensation actions by comparing occlusion characteristics to predetermined or operator implemented thresholds. As an example, the evaluation module 530 may implement a 25% occlusion threshold before notifying an operator of the farming machine. Of course, other thresholds are also possible.

To illustrate, consider an occluded image where approximately 5% of the image data is occluded by an occlusion. In this case, a compensation action is likely able to compensate for the occlusion without sacrificing performance of the farming machine to a large degree. Now consider an occluded image where approximately 30% of the occluded image includes an occlusion. In this case, a compensation action is unlikely to compensate for the occlusion without sacrificing performance of the farming machine. As such, the farming machine 100 generates a notification that a detection mechanism includes an occlusion larger than the threshold allowable occlusion size.

Thresholds may also be applied in other manners. For instance, the evaluation module 530 may apply thresholds to measured results or locations when determining whether to generate a notification for a manager that an occlusion is reducing farming machine performance. Location In a third example, the evaluation module 530 evaluates compensation actions by analyzing occlusion characteristics for occlusions in an image. If the occlusion characteristics indicate that the occlusion is in a location of the image and/or of sufficient size that the occlusion will substantially impair performance of the farming machine 100 (e.g., the center), the evaluation module 530 may generate a notification for an operator of the farming machine indicating the existence of the occlusion.

To illustrate, again consider an example of a farming machine 100 performing farming actions in a field 160. The evaluation module 530 is configured to allow compensation actions for occlusions that occur within 10% of an edge of an image, but does not allow compensation actions for occlusions that occur within the middle 50% of an image. Of course, other location-based compensation actions are also possible.

Given this example context, consider an occluded image where an occlusion runs along its edge. In this case, the compensation module 520 may try to implement a compensation action cropping the edge of the occluded image. Because the cropping is a small part of the image data, the compensation action is likely able to compensate for the occlusion without sacrificing performance of the farming machine. As such, the evaluation module 530 allows implementation of the compensation action.

Now consider an occluded image where an occlusion occurs in the center of the image and represents over 50% of the image data. In this case, the compensation module 520 may generate a compensation action, but that compensation action is unlikely to compensate for the center-based occlusion without sacrificing performance of the farming machine 100. As such, the evaluation module 530 prevents implementation of the compensation action, and generates a notification for a manager regarding the occlusion.
Importance In a fourth example, the evaluation module 530 evaluates compensation actions by determining according to an importance of a detection system 110 capturing the image. That is, if a detection mechanism 110 is important to sufficient operation of the farming machine 100, the evaluation module 530 may generate a notification for occlusions that it would not generate for detection mechanisms 110 deemed less important.

As an example, consider a farming machine 100 with two detection mechanisms 110A, 110B. The first detection mechanism 110A is forward facing, and the second detection mechanism 110B is rearward facing. The forward-facing detection mechanism 110A is pivotal in identifying plants for treatment, while the rearward facing detection mechanism 110B is used for verifying treatments. The farming machine 100 accesses an occluded image from the rearward facing detection mechanism 110B, and an occluded image from the forward-facing detection mechanism 110A.

In this case, a compensation action is probably able to compensate for the occlusion in the rearward facing detection mechanism 110B without sacrificing farming machine 100 performance (because that camera is not important in the identification process flow). However, a compensation action is unlikely to compensate for the occlusion for the forward-facing detection mechanism 110A without sacrificing farming machine 100 performance (because the forward-facing detection mechanism 110 is important). As such, the evaluation module 530 generates a notification that the forward-facing detection mechanism 110A includes an occlusion that is detrimental to farming machine 100 performance, while the evaluation module 530 does not generate a similar notification for the rearward facing detection mechanism 110B.

VI. Example Workflows

VI.A Monitoring Compensation Actions for Farming Machine Performance

Figure 7:
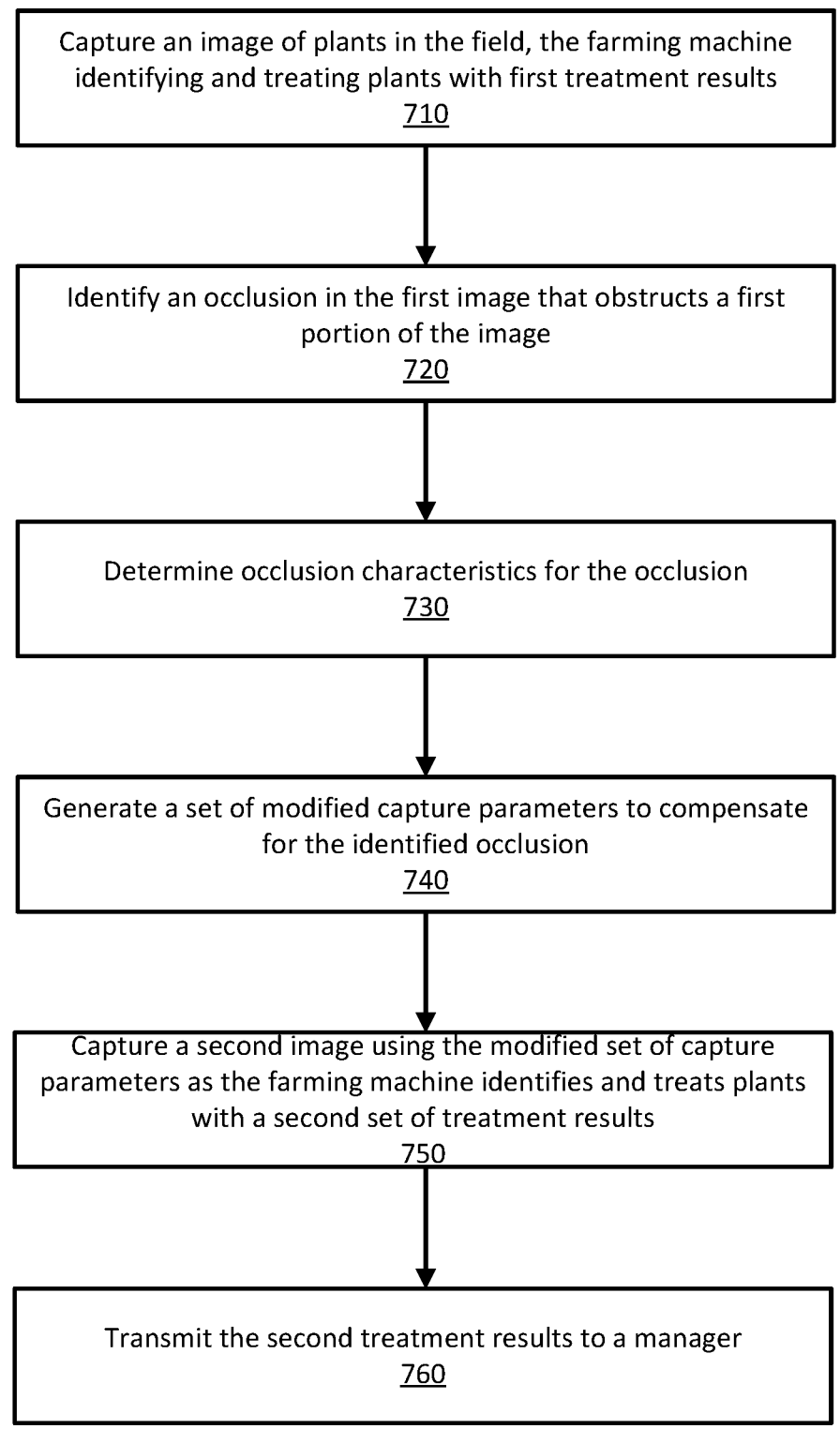
FIG. 7 illustrates a method for compensating for identified occlusions, in accordance with an example embodiment.

FIG. 7 illustrates a method for compensating for identified occlusions, in accordance with an example embodiment. The method 700 can include greater or fewer steps than described herein. Additionally, the steps can be performed in different order, or by different components than described herein.

The method 700 may be performed by a farming machine 100 that moves through a field 160 performing farming actions. In an example, the farming machine 100 includes a plurality of treatment mechanisms 120 configured to perform spray treatments as farming actions. The method 700 may be performed from the perspective of the control system 210, and the control system 210 is configured to identify and treat plants based on captured images. The control system 210 also employs an occlusion module 212 configured to compensate for occlusions identified in captured images.

The farming machine 100 causes a detection mechanism 110 (e.g., an image acquisition system such as a camera) to capture 710 (or access) a first image of the field 160. The detection mechanism 110 captures the first image using an initial set of capture parameters. The farming machine 100 determines that it is performing farming actions (e.g., identifying and treating plants) with first treatment results when capturing images using the initial set of capture parameters. For example, the farming machine calculates a first efficiency for plant treatment based on the first image and associates the first efficiency with the first image.

The farming machine 100 identifies 720 an occlusion in the first image using the methods described hereinabove. The occlusion obstructs at least a portion of the image such that a portion of the environment is occluded in the image. The farming machine 100 determines 730 occlusion characteristics describing the occlusion based on the image data in the first image. The occlusion characteristics may include information such as size, shape, and position of the occlusion in both the first image and the real world.

The farming machine 100 generates 740 a modified set of capture parameters (or some other compensation action) to compensate for the identified occlusion based on the determined occlusion characteristics. For example, the farming machine 100 may generate a dynamic mask that corresponds to the size, shape, and location of the occlusion in the first image as indicated by the occlusion characteristics.

The farming machine 100 implements the modified set of capture parameters (or some other compensation action) to compensate for the identified occlusion. The farming machine 100 may continue capturing images of the field using the modified set of capture parameters. Moreover, the farming machine 100 may continue to perform farming action in the field using images captured with the modified set of capture parameters.

Stated similarly, the farming machine captures 750 a second image of plants in the field using the modified capture parameters. The farming machine 100 determines that it is performing farming actions with second treatment results different from first treatment results, and the determination may be based on information in the second image. Because the second set of treatment results are different than the first set of treatment results, the farming machine 100 generates a notification for the manager of the farming machine 100 indicating that the farming machine 100 is producing the second set of treatment results. In other words, the farming machine transmits 760 the second set of treatment results to the manager.

As described above, generating the notification may occur in various circumstances. For example, the farming machine 100 may generate a notification because the second set of treatment results indicate that an efficiency of the farming machine 100 has reduced more than a threshold amount, identifying a difference between the first and second treatment results greater than a threshold amount, an expected amount of treatment fluid is higher in the second set of treatment results than the first set of treatment results, an expected number of plants treated in the second set of treatment results is different from the expected number of plants treated in the first set of treatment results, etc.

VI.B Identifying a Detection Mechanism which Captured an Occlusion

Figure 8:
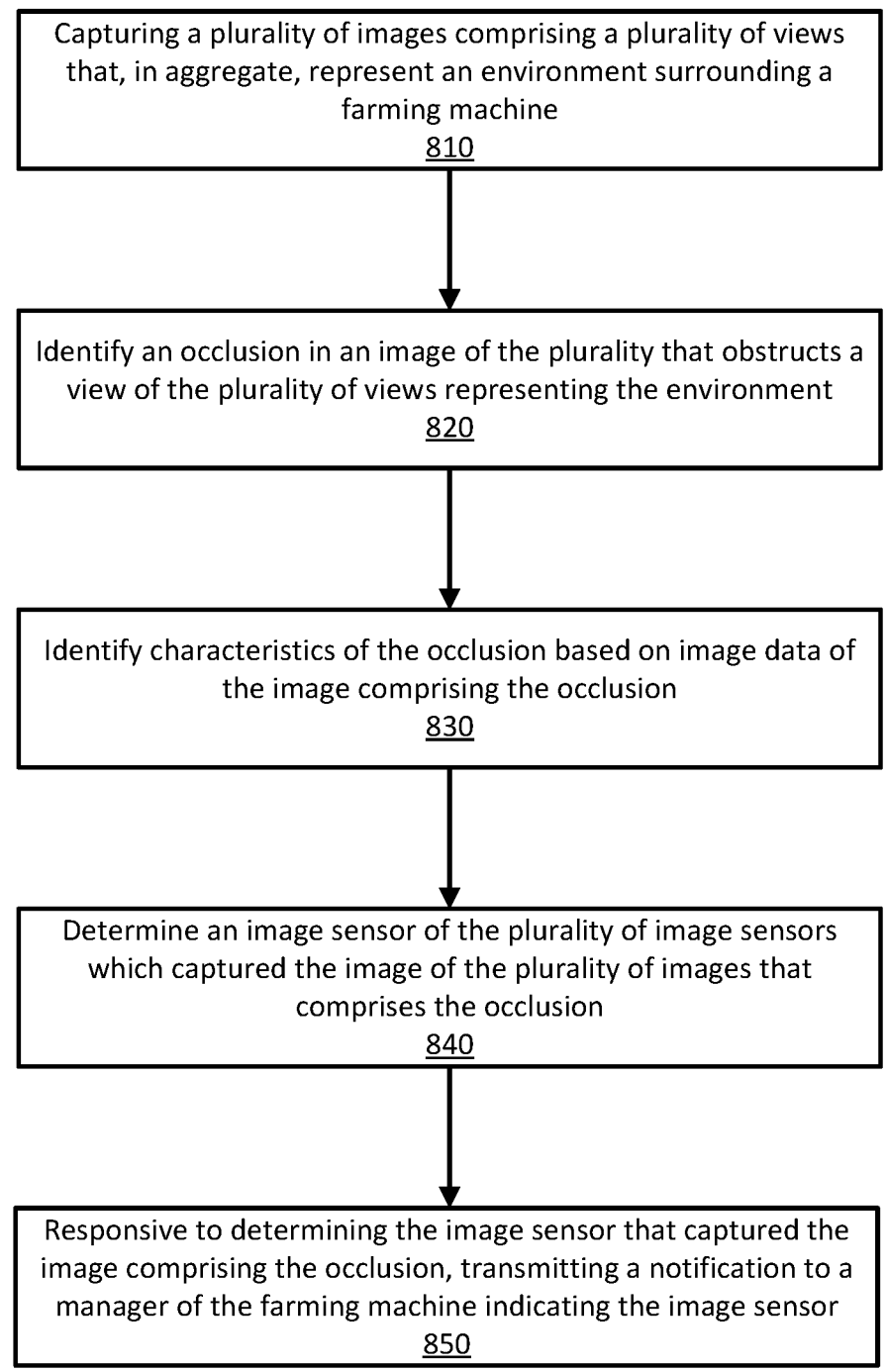
FIG. 8 illustrates a method for compensating for identified occlusions, in accordance with an example embodiment.

FIG. 8 illustrates a method for compensating for identified occlusions, in accordance with an example embodiment. The method 800 may include greater or fewer steps than described herein. Additionally, the steps can be performed in different order, or by different components than described herein.

The method 800 may be performed by a farming machine 100 that moves through a field 160 performing farming actions. The method 800 may be performed from the perspective of the control system 210, and the control system 210 is configured to identify and treat plants based on captured images. The control system 210 also employs an occlusion module 212 configured to identify occlusions in captured images.

The farming machine 100 is configured with a plurality of detection mechanisms 110 (e.g., image acquisition systems). Each detection mechanism 110 is configured to capture images, and the plurality of detection mechanisms 110 capture 810 a plurality of images. The captured plurality of images comprise a plurality of views that, in aggregate, form a representation of the environment 102 surrounding the farming machine 100. In other words, the array of images captured by the detection mechanisms 110 form an image-data representation of the environment 102 surrounding the farming machine.

The farming machine 100 identifies 820 an occlusion in an image of the plurality of images. The occlusion obstructs a view, or views, in the image. Because of the occlusion, the representation of the environment formed by the aggregate plurality of images is incomplete (due to the of the occluded views).

The farming machine 100 identifies 830 characteristics of the occlusion based on image data of the image comprising the occlusion. The characteristics may include any of the virtual size, shape, and location of the occlusion, or the real-world size, shape, and location of the occlusion. Additionally, the characteristics may include information regarding the detection mechanism 110 which captured the image comprising the occlusion. Characteristics for the occlusion associated with the detection mechanism 110 may include the location of the detection system on the farming machine, an address of the detection mechanism, etc.

The farming machine 100 determines 840 which detection mechanism of the plurality of detection mechanisms captured the occlusion using the occlusion characteristics. In a simple example, if the occlusion characteristics include a real-world location of the detection mechanism on the farming machine 100, the farming machine 100 may use that information to determine which detection mechanism includes the occlusion. In a more complex example, the farming machine 100 may apply identification algorithms to the image data comprising the occlusion to determine which camera captures an image comprising the occlusion.

Responsive to determining which detection mechanism captured the occlusion, the farming machine 100 transmits 850 a notification to a manager of the farming machine 100 indicating which detection mechanism 110 has an occlusion.

VII. Control System

Figure 9:
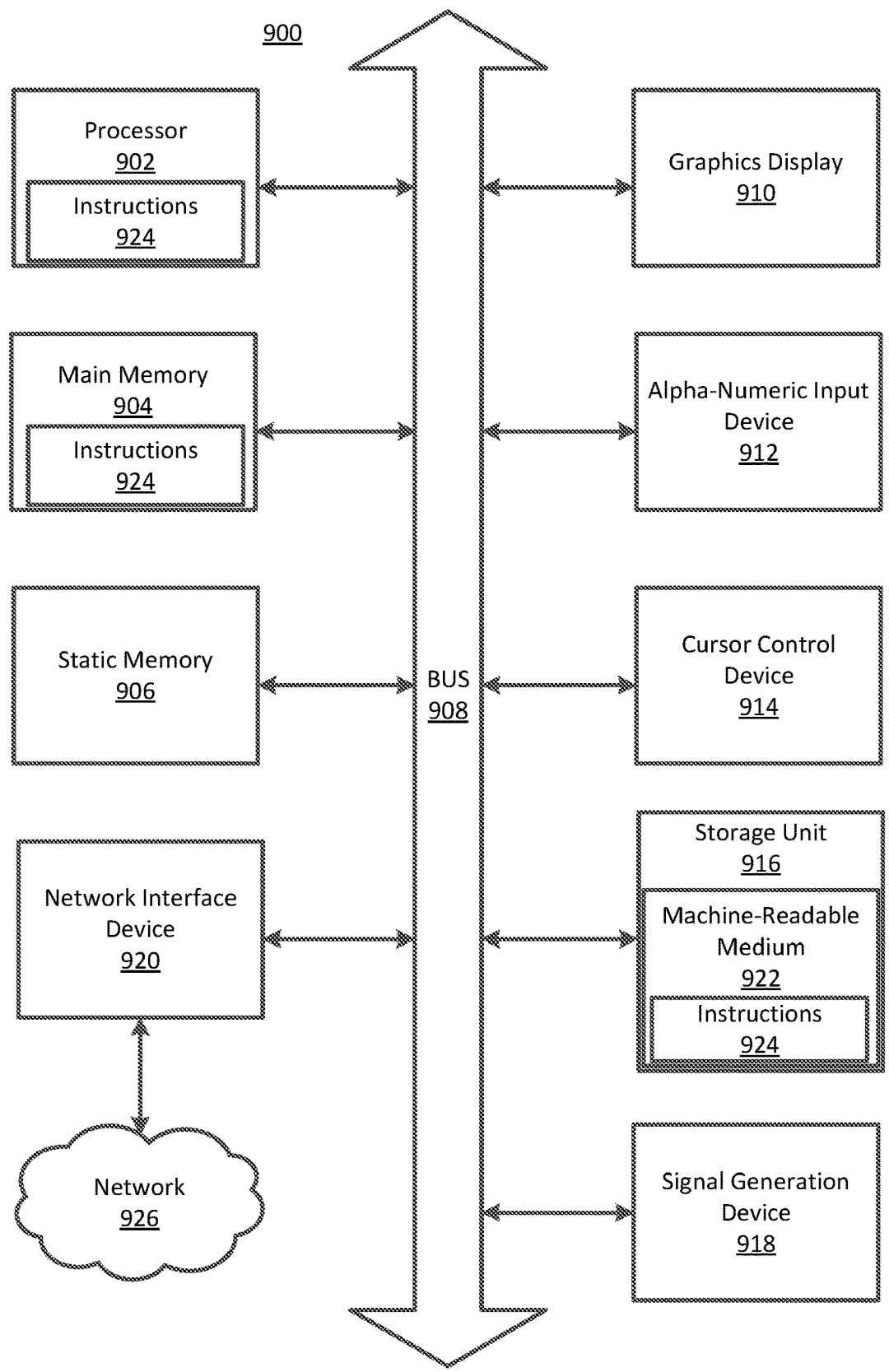
FIG. 9 is a block diagram illustrating components of an example machine for reading and executing instructions from a machine-readable medium, according to one example embodiment.

FIG. 9 is a block diagram illustrating components of an example machine for reading and executing instructions from a machine-readable medium. Specifically, FIG. 5 shows a diagrammatic representation of control system 210 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the system 130 described in FIG. 2. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 (e.g., network 220) via the network interface device 920.

VIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method of operating a farming machine comprising:
   capturing a first image of plants in a field with an image acquisition system of the farming machine using an initial set of capture parameters, the farming machine performing spray treatment actions of a treatment plan, and the image acquisition system configured to capture images with different capture parameters;
   determining that the farming machine is performing spray treatment actions of the treatment plan with a first set of treatment results, wherein treatment results are a representation of an accuracy of performed spray treatment actions of plants in the field;
   identifying an occlusion in the first image by applying an object detection model to pixels in the first image, the occlusion obstructing a field of view of the image acquisition system in a portion of the first image;
   determining occlusion characteristics representative of the occlusion based on image data in the first image;
   generating, using the occlusion characteristics, a dynamic mask for applying to pixels of images captured by the image acquisition system, the dynamic mask implementing a modified set of capture parameters to compensate for the identified occlusion; and
   responsive to generating the dynamic mask:
      capturing a second image of plants in the field with the image acquisition system using the dynamic mask and the modified set of capture parameters that compensate for the occlusion;
      determining that the farming machine is performing spray treatment actions of the treatment plan with a second set of treatment results, the second set of treatment results having are decreased in accuracy with occlusion compensation relative to the first set of treatment results without occlusion compensation by at least a threshold difference; and
      transmitting the second set of treatment results to a manager of the farming machine.

2. The method of claim 1, wherein the dynamic mask is configured to remove pixels from the images obstructed by the occlusion.

3. The method of claim 1, wherein the dynamic mask is configured to remove outputs of the object detection model classified as the occlusion.

4. The method of claim 1, wherein identifying the occlusion in the first image comprises applying an object detection model to the first image, the object detection model configured to classify at least plants and occlusions in the first image.

5. The method of claim 1, wherein the occlusion is a part of the farming machine.

6. The method of claim 1, wherein the first set of treatment results and the second set of treatment results quantify an expected amount of treatment fluid applied in the field, and the second set of treatment results are higher than the first set of treatment results.

7. The method of claim 1, wherein the first set of treatment results and the second set of treatment results quantify an expected number of plants treated by the farming machine, the second set of treatment results are different from the first set of treatment results.

8. A farming machine comprising:
   an image acquisition system configured to capture images of plants in a field according to capture parameters;
   one or more sensors configured to measure treatment results of the farming machine;
   one or more processors physically attached to the farming machine; and
   a non-transitory computer readable storage medium storing computer program instructions that, when executed by the one or more processors, cause the one or more processors to:
      capture, using the image acquisition system, a first image of plants in the field using an initial set of capture parameters associated with a first set of treatment results, the farming machine performing spray treatment actions of a treatment plan;
      determine that the farming machine is performing spray treatment actions of the treatment plan with a first set of treatment results, wherein treatment results are a representation of an accuracy of performed spray treatment actions of plants in the field;
      identify an occlusion in the first image by applying an object detection model to pixels in the first image, the occlusion obstructing a field of view of the image acquisition system in a portion of the first image;
      determine occlusion characteristics representative of the occlusion based on image data in the first image;
      generate, using the occlusion characteristics, a dynamic mask for applying to pixels of images captured by the image acquisition system, the dynamic mask implementing a modified set of capture parameters to compensate for the identified occlusion; and
      responsive to generating the dynamic mask:
         capture a second image of plants in the field with the image acquisition system using the dynamic mask and the modified set of capture parameters that compensate for the occlusion;
         determine that the farming machine is performing spray treatment actions of the treatment plan with a second set of treatment results, the second set of treatment results having are decreased in accuracy with occlusion compensation relative to the first set of treatment results without occlusion compensation by at least a threshold difference; and
         transmit the second set of treatment results to a manager of the farming machine.

9. The farming machine of claim 8, wherein the dynamic mask is configured to remove pixels from the images obstructed by the occlusion.

10. The farming machine of claim 8, wherein the dynamic mask is configured to remove outputs of the object detection model classified as the occlusion.

11. The farming machine of claim 8, wherein computer program instructions identifying the occlusion in the first image further causes the one or more processors to apply an object detection model to the first image, the object detection model configured to classify at least plants and occlusions in the first image.

12. The farming machine of claim 8, wherein the occlusion is a part of the farming machine.

13. The farming machine of claim 8, wherein the first set of treatment results and the second set of treatment results quantify an expected amount of treatment fluid applied in the field, and the second set of treatment results higher than the first set of treatment results.

14. The farming machine of claim 8, wherein the first set of treatment results and the second set of treatment results quantify an expected number of plants treated by the farming machine, and the second set of treatment results are different from the first set of treatment results.

15. A non-transitory computer readable storage medium storing computer program instructions for operating a farming machine that, when executed by one or more processors, cause the one or more processors to:
- capture a first image of plants in a field with an image acquisition system of the farming machine using an initial set of capture parameters, the farming machine performing spray treatment actions of a treatment plan, and the image acquisition system configured to capture images with different capture parameters:
- determine that the farming machine is performing spray treatment actions of the treatment plan with a first set of treatment results, wherein treatment results are a representation of an accuracy of performed spray treatment actions of plants in the field;
- identify an occlusion in the first image by applying an object detection model to pixels in the first image, the occlusion obstructing a field of view of the image acquisition system in a portion of the first image;
- determine occlusion characteristics representative of the occlusion based on image data in the first image;
- generate, using the occlusion characteristics, a dynamic mask for applying to pixels of images captured by the image acquisition system, the dynamic mask implementing a modified set of capture parameters to compensate for the identified occlusion;

responsive to generating the dynamic mask:
- capture a second image of plants in the field with the image acquisition system using the dynamic mask and the modified set of capture parameters that compensate for the occlusion;
- determine that the farming machine is performing actions of the treatment plan with a second set of treatment results, the second set of treatment results having are decreased in accuracy with occlusion compensation relative to the first set of treatment results without occlusion compensation by at least a threshold difference; and
- transmitting the second set of treatment results to a manager of the farming machine.

* * * * *